United States Patent [19]

Fahrenschon et al.

[11] 4,187,414
[45] Feb. 5, 1980

[54] CIRCUIT ARRANGEMENT FOR AN INTERFERENCE DATA ALARM SYSTEM IN COMMUNICATION FACILITIES, PARTICULARLY IN TELEPHONE EQUIPMENT

[75] Inventors: Franz Fahrenschon, Neuried; Heinz Huettl, Wolfratshausen; Ewald Dotzauer, Sauerlach, all of Fed. Rep. of Germany

[73] Assignee: Siemens Aktiengesellschaft, Berlin & Munich, Fed. Rep. of Germany

[21] Appl. No.: 889,260

[22] Filed: Mar. 23, 1978

[30] Foreign Application Priority Data

Mar. 29, 1977 [DE] Fed. Rep. of Germany ....... 2713937

[51] Int. Cl.² ...................... G08B 29/00; H04M 11/00
[52] U.S. Cl. ......................... 179/175.3 S; 340/147 SC
[58] Field of Search ............... 179/175.3 S, 2 R, 2 A, 179/18 EA, 2 DP, 175.2 R; 340/147 SC

[56] References Cited

U.S. PATENT DOCUMENTS

| | | | |
|---|---|---|---|
| 3,983,340 | 9/1976 | Lima et al. | 179/175.3 S |
| 4,076,961 | 2/1978 | Holsinger et al. | 179/2 DP |
| 4,119,815 | 10/1978 | Frankfort et al. | 179/18 EA |

FOREIGN PATENT DOCUMENTS 1274670 8/1968 Fed. Rep. of Germany.

Primary Examiner—Thomas A. Robinson
Attorney, Agent, or Firm—Hill, Van Santen, Steadman, Chiara & Simpson

[57] ABSTRACT

Error and condition messages are transmitted from unmanned telecommunication facilities to a central exchange having a maintenance control station. In order to safeguard this interference data alarm system against interferences in the secondary station and in the telephone network, the transmitting test unit is inserted in several lines used for normal telecommunications traffic, said lines leading to the maintenance control station. In order to transmit the messages, any one of these lines can be automatically selected for maintenance purposes by the transmitting test unit, whereupon a connection to the maintenance control station is automatically established and the necessary data sent to such station. A data dialog for error analysis is possible.

7 Claims, 2 Drawing Figures

CIRCUIT ARRANGEMENT FOR AN INTERFERENCE DATA ALARM SYSTEM IN COMMUNICATION FACILITIES, PARTICULARLY IN TELEPHONE EQUIPMENT

BACKGROUND OF THE INVENTION

The invention relates to a circuit arrangement for an interference data alarm system in communication facilities, particularly in telephone equipment, in which a maintenance control station is centrally arranged in one of the facilities, in which a receiver test unit accommodates all error and condition messages, which are determined and transmitted by transmitting test units of unmanned secondary stations.

In smaller communication facilities, for example in telephone exchanges, errors within the equipment are relatively rare. For this reason it is uneconomical to have a maintenance man continuously available in each of these facilities. This would be particularly uneconomical in small branch facilities, whose maintenance was taken over by a particular maintenance firm. In order to economically operate there, and to nevertheless be available in the respective facility in case of an interference, it is known to establish a central maintenance control station in which, in case of an error or an interference of a facility, corresponding alarms are transmitted. Depending upon the type of interference signaled, the central maintainence control station sends a maintenance man to the facility which is interfered with, who can be intentionally employed for the removal of this interference in accordance with his training status and experience.

From telecontrol engineering it is already generally known to transmit interference data, counter positions and condition messages to a central testing and control location and to also call up or poll said data intentionally, when required. Moreover, the central station also introduces control and switching processes and acknowledges their execution.

A transmission of such error and condition messages to a central station is only then possible, however, when the facility from which the message is to be transmitted is yet so operable that the interference message can be sent. If, for example, the transmitting test unit for the messages is connected to the exchange like a subscriber in order not to provide its own message lines for the relatively rare interferences, an interference in one of the facilities taking part in the connection to the central maintenance control station already prevents the transmission of the interference message so that the equipment appears error-free. Even a power failure, for example, due to a released safety fuse within the exchange equipment, prevents an error message.

SUMMARY OF THE INVENTION

It is the object of the invention to provide a circuit arrangement making such an interference data alarm system as interference-free as possible so that it guarantees a perfect error and condition message transmission with practically all occurring cases of interference. Special interference communication lines are not to be required.

This is inventively obtained in that the transmitting test unit of each of the secondary locations is inserted in several lines which are used for the normal communication traffic leading to the equipment in which the maintenance control station is located, and that the transmitting test unit contains devices which independently carry out the connection buildup and the transmission of the messages, independently of the equipment of the secondary station such as, for example, the connection sets, the coupling field or the current supply.

The transmitting test unit has several connection possibilities available in that said transmitting test unit is inserted in several lines which lead to the maintenance control station. Should one of these lines, or devices required for the operation and connected to said lines, be defective, the transmitting test unit can use a different line available in order to transmit its message.

The lines leading to the facility with the maintenance control station to which the transmitting test unit has access, are used for the normal communication traffic. This has the advantage that no expensive special message lines, which are relatively little utilized, have to be laid out. In order for the monitoring devices of the secondary station not to consider a line, released for the transmission of the test messages, as interfered with, the portion of the line not required is electrically occluded with a simulation of the severed portion of the line. Unnecessary error messages are prevented in this manner.

In order for the transmitting test unit to be as independent as possible from the equipment of the secondary station, it contains apparatus which undertake the connection buildup and the transmission of the messages, and also its own current supply which are fed by the public power supply. Thus, the transmitting test unit and the lines leading to the central maintenance station are unaffected by a greater interference in the secondary station, or by an interference which could otherwise prevent the transmission of the alarms.

In accordance with a further development, the transmitting test unit can be dialed in order to interrogate the transmitting test unit for errors or status signal messages.

In this manner it is possible to undertake an interference signalization and monitoring from a maintenance control station in remote control.

In accordance with a further development of the invention the messages are polled at will in a dialog mode traffic.

In this manner it is possible to consecutively interrogate at will processes and devices monitored at the transmitting test unit by means of dialing from the maintenance control station, and to thus obtain a sectionalization of the error location and finally the determination of the error.

In accordance with another development of the invention, a modem is used for the conversion of the messages.

In accordance with another development of the invention, the transmitting test unit interrogates in regular time intervals in order to self-monitor the secondary station, and interrogates in shorter intervals errors and condition criteria than is required for a transmission to the maintenance control station, and in case of lack or absence of alterations of these criteria, this fact is transmitted to the maintenance control stations as an error message.

Thereby the remote-controlled interrogation of errors and their monitoring is safeguarded in the manner that even with a nonsignaling of these errors an error determination is guaranteed within a short time by means of the additional interrogation possibility of the maintenance control station.

An example of the invention is subsequently described with the aid of the accompanying sheet of drawings; other objects, features and advantages will be apparent from this detailed disclosure and from the appended claims.

DETAILED DESCRIPTION

The illustrated devices are to be understood as examples only, other exchanges with other coupling fields, connection set units, signalization methods, etc., can be utilized. The description also assumes that the unmanned secondary stations are branch exchanges, and that the maintenance control station is located in a public exchange. However, the secondary stations can also be public exchanges which are not only used for telephone traffic, but which also transmit data traffic or other technical communication. However, the maintenance control station can also be connected to a branch exchange, which can be reached via a public exchange.

As mentioned already, the illustrated exchange A is a branch exchange, which, as secondary station of an interference data-communication system, transmits error and condition messages to the public exchange facility Z and to the maintenance control station connected to it via exchange lines. A number of subscribers Tn are connected to the coupling fields KF of both facilities via subscriber circuits TS. The transmitting test unit M in the exchange A and the receiver test unit E in the exchange Z can be reached via such subscriber circuits TS; moreover, in the exchange A one of several home sets HS is drawn, however, not explained further. Finally, two additional exchange connection sets AS, representing several, are illustrated, which handle the outgoing traffic from the exchange A to the exchange Z.

The described subscriber circuits TS, the home sets HS, the exchange sets AS, the coupling field KF and the other devices, not shown here, are operated by a network controller NS in the known, and therefore not more precisely described, manner via control sets SS, if necessary.

In accordance therewith, the drawn subscriber circuits TS and connection sets KS for incoming traffic from the exchange A, are connected to the apertaining network controller NS in the exchange Z.

It is assumed that the exchange B and other unmanned secondary stations are connected to the exchange Z via similar lines.

Figure 1:
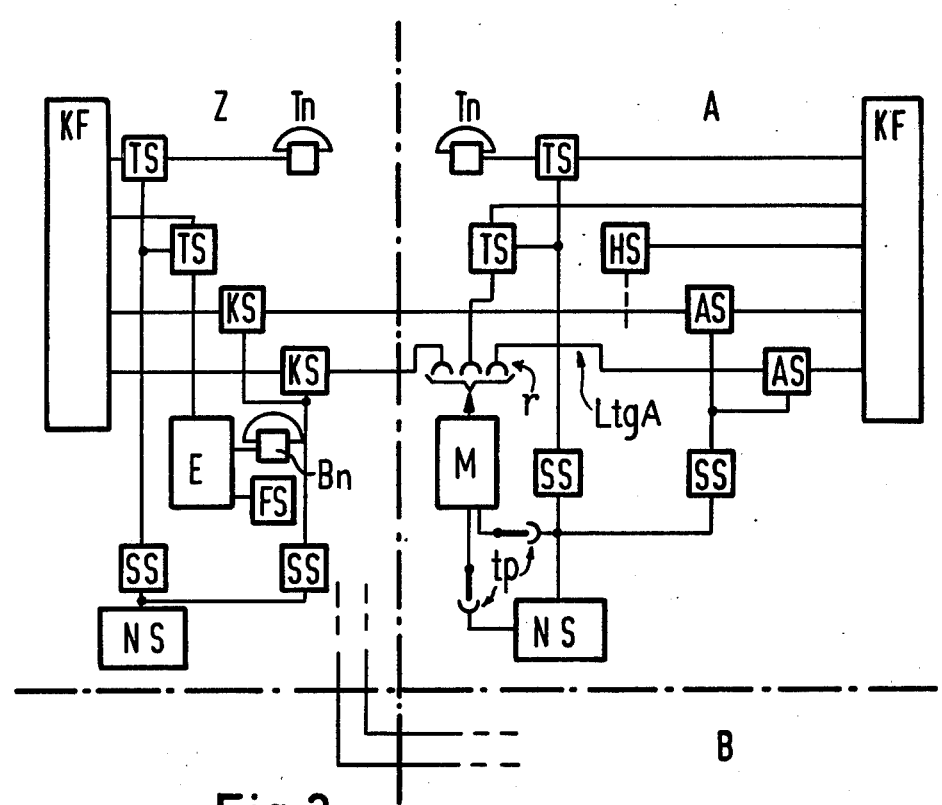
FIG. 1 shows a possible arrangement of a central telephone exchange, in which the maintenance control station is arranged, and which is associated with several unmanned secondary stations.

Several of the exchange lines generally designated LtgA connecting the unmanned exchange A with the central exchange Z, are conveyed via connecting receptacles r in the exchange A. Aside from a subscriber circuit TS, already mentioned, a number of test points such as those indicated at tp abut connecting jacks, as is indicated in FIG. 1. These test points such as tp can be points of diagnosis or other scanning points for error or operating conditions. These test points can be connected to the network controller, to the line network, to outputs of test equipment, to alarm equipment, to fuses, etc.

The transmitting test unit M can be connected to all or several of these test points, and also to the power network, with the aid of multiway connectors or individual plugs. If the transmitting test unit M is not portably designed, it can also be built into a rack and be rigidly connected to the test points of interest.

The receiver test unit E, which accommodates all messages transmitted by the transmitting test unit M, acknowledges them, and records them if necessary, with the aid of a teletypewriter FS, is located in the central office Z. An additional command station Bn is connected to the receiver test unit E via which the messages and data can be polled at will by means of dialing specific, previously determined call numbers in the secondary stations. Moreover, conversations with the maintenance personnel, presently located in the secondary stations, or with a person who is expecting a call (line test) can be conveyed via this command station Bn.

Figure 2:
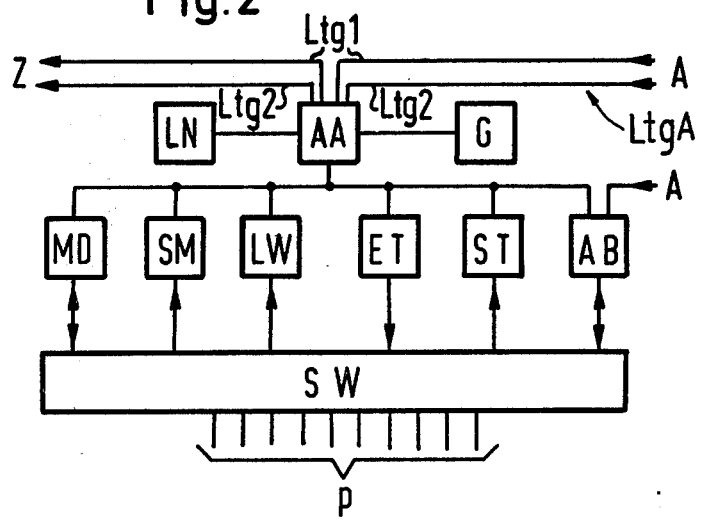
FIG. 2 shows the devices of a transmitting test unit of an unmanned secondary station.

The transmitting test unit M, for example, is designed such as FIG. 2 illustrates. Two lines Ltg1 and Ltg2, of the line group LtgA designated for directional traffic, leading from exchange a to the exchange Z, are conveyed via the connector AA just as via a series telephone. In case of need, one of the exchange lines is severed from the branch exchange equipment at this point and connected to the function groups of the transmitting test unit M.

In through-dial equipment, line monitoring criterion supplied in any exchange by the counter transmission, is simulated in the line simulation device LN so the equipment of the branch exchange A does not signal the severing of the line as an interference. Simultaneously, the loop to the exchange Z is closed in the line equipment LW, and in the signal receiver for audio frequencies ET is determined whether an exchange dial signal is present in the line.

The line equipment LW subsequently connects dial criteria to the exchange line in order to construct a connection to the receiver test unit E. The dial criteria can be dial impulses or audio frequencies in the MFV-code. After the call number of the central maintenance control station is dialed, the receiver ET for audio frequencies monitors whether a free signal, a busy signal or an identification tone signal is transmitted back by the central maintenance station. As soon as the identification tone is recorded for the signal that the receiver test unit E is reached, the signal transmitter ST for audio frequencies transmits a corresponding reply tone. Subsequently signals of the proper audio frequency are transmitted by the transmitter ST in order to identify the transmitting test unit M of the exchange A.

As soon as the receiver ET receives an acknowledgment tone, additional audio frequency signals are transmitted block by block from the transmitter ST, transmitting the actual message. At the end of the data block, the acknowledgment of the opposite station is again expected. After the last block, the connection is again released by the connector AA so that again normal exchange traffic can proceed via this line.

If the messages to the central maintenance control station are to be transmitted in MFV-code, the transmitter SM for these signals is connected for this purpose instead of the transmitter ST.

As the exchange A is a branch exchange facility, these calls are to be charged by the central maintenance control station. For this purpose the receiving test unit E also contains a charge counter (such as that indicated at G, FIG. 2, for unit M) to which the counting impulses are transmitted in the known manner.

If at the beginning of the connection preparation no free signal or also no busy signal or identification signal is received because a first selected line, for example Ltg1, is itself interfered with, then the connector AA immediately releases this line. After a determined waiting period, the connection is then attempted with the second exchange line Ltg2. If thereby also no connection is produced, for example after repeated attempts, then the total cable to the exchange Z is probably interfered with, which is finally determined by the maintenance personnel of the exchange Z. Then merely an additional alarm signal is switched on in the exchange A, which indicates this condition of the connection cable LtgA.

With the aid of FIG. 2 it was being described that two exchange lines are conveyed via the transmitting test unit M. Depending upon the size of the exchange A and the number of exchange lines, more or less exchange lines, or even all exchange lines, if necessary, can run via the connector AA. It is, moreover, possible to connect not only directional exchange lines to the transmitting test unit, but also the ones operated either way.

The transmitting test unit M, as already described, can also be reached in the incoming traffic via the subscriber circuits TS. If the subscriber line, conveyed to the transmitting test unit M, is called by through-dial via the branch exchange facility A, a data transmission procedure can proceed via the prepared through-dial connection in the transmission test unit M. In that case, the type of data to be transmitted is determined from the outset.

However, it is also possible to realize a data polling without a special subscriber line. Therefor a call number is fictitiously assigned to the transmitting test unit M. When receiving this call number, the dial evaluation of the branch facility transmits a signal to the transmitting test unit M after this fictitious call number was dialed in direct-dial mode by the command station Bn or by the receiver test unit E. On the basis of this signal a connection, as described, can be prepared by the transmitting test unit M and a data transmission can be carried out. For this method correspondingly different data can also be polled by means of determining several fictitious call numbers for the transmitting test unit M.

If the branch exchange facility A is a larger exchange, in which as a result there is much data to be transmitted, or if many secondary stations A, B are connected to the central maintenance control station in the exchange Z, so that a normal transmission of data would excessively block the maintenance control station, the additional possibility exists of employing a modem at both sides of the exchange line, which connects the signals to the line with the corresponding preparation. Such a modem MD is indicated in FIG. 2, with the aid of which a dialog mode traffic can also be carried out.

A connecting device Ab is provided for the calls coming from exchange A, said device having access via the connector AA to the presently occupied exchange line such as Ltg2.

The control of the devices of the transmitting test unit M is carried out by a control unit SW. In this control unit a connecting device is also present, which selects the connecting points p (such as test points tp, FIG. 1) in the required sequence in the manner known; it also determines the potential condition at the connecting points and preprocesses such that a transmission to the central maintenance control station can be undertaken.

The transmitting test unit M in the normal case automatically transmits error and alarm messages to the maintenance control station in preset time intervals. However, if other messages are required in the maintenance control station, for example, condition messages at individual scanning points of the facility or data from traffic monitorings or measurements, it is expedient to poll individual types of data with the aid of the selectively activated apparatus described. These data can also be assured with the aid of check digits (parity checks) and with acknowledgments.

A remote resetting of the counters with which the data are collected and preprocessed, is also possible in the branch exchange facility A by means of a telephone call. However, the resetting can also proceed automatically at a preset point of time or after transmitting the corresponding data.

The transmitting test unit M can also by itself supply the function of the exchange A, particularly of the devices which supply the connecting points p or a message bus leading to said transmitting test unit M. The transmitting test unit interrogates these devices in specific time intervals, which are much shorter than the intervals at which it transmits the messages to the maintenance control station. Said transmitting test unit thereby determines that there are present different, if necessary varying potential conditions. If only conditions are present which correspond with the rest potentials, or which have not altered between two interrogations, or which indicate an error in another manner, the transmitting test unit M, even outside of the prescribed time intervals, transmits the result of this self-monitoring.

It will be apparent that many modifications and variations may be effected without departing from the scope of the novel concepts and teachings of the present invention.

We claim as our invention:

1. A circuit arrangement for an interference data alarm system in communication facilities, particularly in telephone equipment, operable for communication with a maintenance control station located at one of the facilities and including a receiver test unit for receiving all error and condition messages, which are determined and transmitted by transmitting test units of unmanned secondary stations, characterized in the circuit arrangement comprising means for inserting the transmitting test unit (M) of each of the secondary station (A, B) into lines (Ltg1, Ltg2) used for normal telecommunication traffic with the one facility (Z), in which the maintenance control station (E, Bn, FS) is located, and comprising devices forming part of the transmitting test unit (M) which are operable independently of the switching equipment (e.g. AS, KF) of the secondary station (A), to independently undertake the connecting preparation and the transmission of the messages via said lines (Ltg1, Ltg2).

2. A circuit arrangement in accordance with claim 1, further comprising means adapting the transmitting test unit (M) to be dialed from the maintenance control station (E, Bn, FS) in order to poll error or condition messages which have been established at the transmitting test unit (M).

3. A circuit arrangement in accordance with claim 2, characterized in that with the adapting means the messages can be polled at will in a dialog mode.

4. A circuit arrangement in accordance with claim 1, 2 or 3, characterized in that the transmitting test unit (M) interrogates in regular time intervals in order to self-monitor the secondary station (A, B), and interrogates in shorter time intervals error and condition criteria than is required for a transmission to the maintenance control station, and in case of absence or lack of alterations of these criteria transmits this fact to the maintenance control station (Z) as an error message.

5. A circuit arrangement in accordance with claim 1, characterized in that a modern (MD) is used for conversion of the messages at the transmitting test unit (M).

6. A circuit arrangement in accordance with claim 1, characterized in that one of the lines (Ltg1), used for normal telecommunication traffic, is released in order to transmit the messages from the transmitting test unit (M), and the portion of the line not required is electrically occluded.

7. A circuit arrangement in accordance with claim 1, characterized in that, with an unsuccessful connection preparation via one of the lines (Ltg1) form the transmitting test unit (M), this preparation is attempted via a different line (Ltg2), conveyed via the transmitting test unit (M), and that the respective procedure segment is repeated several times when the connection preparation is interfered with or when the transmission of the messages is interfered with.

* * * * *